United States Patent Office 3,072,594
Patented Jan. 8, 1963

3,072,594
SILAMINE CURING AGENTS
James H. Shultz and Clarence G. Zike, Indianapolis, Ind., assignors, by mesne assignments, to Walter J. Saeman
No Drawing. Filed Apr. 22, 1959, Ser. No. 807,975
28 Claims. (Cl. 260—43)

This invention relates to new compositions derived from the reaction of compounds containing the silicon-nitrogen bond with compounds containing an epoxy group. The present application is a continuation-in-part of application Serial No. 670,631, filed July 9, 1957, now abandoned.

The epoxy or oxirane group

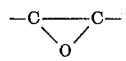

is a well-known functional group occurring in numerous compounds, such as the alkylene oxides, illustrative of which are: ethylene oxide, styrene oxide, butadiene dioxide and 9,10-epoxy stearic acid, and glycidyl ethers derived from, for example, the reaction of epihalohydrins, particularly epichlorohydrin, with hydroxy compounds, such as allyl alcohol, glycerol, phenol, bisphenols and novolaks (normally fusible phenolic-aldehyde condensation products).

The silicon-nitrogen compounds employed in the present invention are those which are formed as the result of a reaction between ammonia or primary amines and a halosilane. Halosilanes are defined herein, under the broadest concept, as silicon halide compounds wherein the halogen atoms are attached directly to the silicon. Included within this definition are silicon tetrahalides, such as silicon tetrachloride, as well as silicon halides having, in general, the generic formula $$R_nSiHal_{4-n}$$

wherein "R" is hydrogen or an organic group attached to silicon, such as the alkyl, aryl, aralkyl, alkenyl, alkynyl, alkoxy, thioalkyl, thioaryl and cyano groups as well as organic groups derived from secondary amines, for example, dialkylamino or diarylamino; "Hal" is a halogen attached to silicon, and "n" is an integer from 1 to 3. Silicon tetrachloride may also be covered by the above formula when $n=0$. Typical compounds resulting from the reaction of a particular class of halosilanes, namely those halosilanes characterized by the presence of organic groups linked to silicon by a C—Si bond, and ammonia or primary amine, are disclosed in Patents 2,564,674; 2,579,-417; and 2,579,418 issued to Nicholas D. Cheronis. An alkoxy-type organic silicon halide and its reaction product with ammonia is described in the Pedlow et al. Patent No. 2,566,363. Also contemplated are the ammonolysis reaction products of the haloalkoxy silicon halides, disclosed in the patent to Rust et al., 2,650,934, these ammonolysis reaction products being further described and claimed in our copending application Serial No. 705,470, filed December 27, 1957.

Reaction products of ammonia or amines with halosilanes, and particularly the polymerized reaction products as described in detail hereinafter, are sometimes referred to as "silamines" or "aminosilanes." The former term will, at times, be used in this specification.

Silamines may be formed, as indicated in the Cheronis patents, by reacting ammonia or a primary amine with a halosilane having one or more halogen atoms attached to the silicon, such as dimethyldichlorosilane or methyltrichlorosilane. The resulting amino compositions are considered to have the following general formulas:

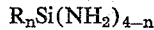

or

depending on whether the halosilane was reacted with ammonia or amine. Many of the reaction products tend to undergo polymerization, immediately upon formation, as discussed more in detail hereinafter. The foregoing reactions are normally conducted at room temperature or below in the presence of an inert solvent and in the absence of water to prevent hydrolysis.

In many instances, the number of replaceable halogen atoms attached directly to the silicon atom and the number of amino groups substituted for such atoms is referred to in terms of functionality. For example, if the halosilane contains one replaceable halogen atom, such a halosilane would be referred to as monofunctional. The resultant ammonolysis or aminolysis reaction products would also be referred to as monofunctional. Likewise, a halosilane having two or three replaceable halogen atoms would be referred to as being di or trifunctional compounds, respectively, as would their corresponding ammonia or primary amine reaction products.

The ammonolysis or aminolysis of a monofunctional halosilane will give the singular anticipated silicon-nitrogen compound containing a single amino group in place of the one chlorine atom. However, as indicated above, it has been found that the tetrafunctional and many of the di and trifunctional ammonolysis or aminolysis reaction products of the corresponding halosilanes as well as similar products obtained from mixed halosilanes tend to undergo polymerization at room temperature, forming either resinous liquids or solids, depending upon the particular starting materials. In fact, it has been found difficult or impossible to isolate many of the monomers of the higher functional reaction products. It is understood that the polymerization occurs by means of a condensation reaction with the liberation of ammonia. Such polymerization reactions involving difunctional reaction products, particularly those containing alkyl groups, tend to form cyclic trimers or tetramers, whereas polymerization reactions involving the higher functional silicon-nitrogen reaction products tend to form straight or branched chain polymers which, in many instances, are believed to consist of a plurality of cyclic rings linked together. When mixtures of halosilanes of different functionality are ammonolyzed or aminolyzed, mixtures of separate polymers or copolymer hybrids may be formed, depending upon the type of halosilanes used.

Certain distinctions may be made with respect to ammonolysis as compared to aminolysis in that in the latter type of reaction, there is less of a tendency for the reaction products to undergo polymerization to the extent that shorter polymers may frequently result. Hence, some degree of control of end products may be obtained by appropriate selection of the initial reactants.

Silamines, in many instances, may be used directly without further modification to form films, coatings or as the principal binder for molding compositions. In addition, silamines may be modified to obtain additional properties desired in an end product or may be used as modifying agents for other compounds.

The silamines have been found to have special utility as modifiers or curing agents for epoxy resins and, particularly, the aforementioned glycidyl ethers derived from a reaction between novolaks and epichlorohydrin or a bisphenol and epichlorohydrin. Novolaks, as distinguished from resoles, are usually formed by condensing, in an acid medium, phenolic compounds, such as phenol, cresols or xylenols, with an aldehyde, primarily formaldehyde. The resulting novolak resins generally are not capable of hardening even when subjected to extended heat and pressure as are the resoles, although they may be subsequently hardened by addition of an agent, such as hexamethylenetetramine. Novolaks and bisphenols are polyhydroxy compounds which, when reacted with epichlorohydrin or similar epihalohydrins in the presence of alkali, result in the formation of glycidyl ether groups. Epoxy resins made from a bisphenol and epichlorohydrin are commercially available for use as coatings and in molding compositions, although such resins normally require a curing agent, for example, a dibasic acid anhydride or an amine, to give a final cured product. A typical epoxy compound of this type is that sold by Shell Chemical Company as Epon 828 and formed by the reaction of bisphenol-A and epichlorohydrin.

There are, however, certain disadvantages in using many of the generally accepted curing agents for such resins which are not present when using silamines for the same purpose. Many silamines may be used directly to cure epoxy resins without a solvent and need not be melted from the solid state as is required with some of the standard epoxy curing agents. Silamines, in general, do not react with epoxy compositions at room temperature and, hence, the two components may be mixed together to form a composition having an appreciable "pot" or "shelf" life. Further, a silamine-epoxy reaction involves low exotherm and the final product of such a reaction, in many instances, is characterized by a high heat distortion.

Accordingly, it is one of the objects of this invention to provide novel intermediate compositions and final compositions which are derived from a reaction between a compound containing an epoxy group and a compound containing a silicon-nitrogen linkage.

Another object is to provide a new curing agent for epoxy-type resinous compounds whereby improved properties can be obtained for such compounds.

A further object is the provision of new resinous compositions particularly useful in forming synthetic laminates, coatings, adhesives and molded products having enhanced properties.

These and other objects will become more apparent from the following further description of the invention.

As indicated hereinabove, polymerization frequently occurs either simultaneously upon or shortly after the ammonolysis or aminolysis of a halosilane. Polymerized trifunctional silamines are considered to be represented generally by the formula:

or

wherein "R" represents an organic group derived from the parent halosilane, and "R'" is an organic group acquired from a primary amine, if the reaction involved aminolysis. The number "1.5," in the above formulas, indicates that each repeating unit of the polymer contains, on the average, one and one-half nitrogen atoms for each silicon atom in the unit and, correspondingly, one organic group attached to the silicon atom. This may be compared to a repeating unit of a corresponding polymerized, wholly difunctional-type silamine wherein each repeating unit, on the average, contains one nitrogen atom and two organic groups attached to a silicon atom. Polymerized tetrafunctional silamines derived from silicon tetrachloride, for example, have no organic groups attached to the silicon. Hybrid copolymers will have intermediate ratios of organic groups vs. nitrogen atoms attached to silicon. Suggested structures for the repeating units of polymerized polyfunctional silamines are disclosed in the aforementioned Cheronis patents and, particularly, Patent 2,579,418, such structures being characterized by having an Si—N—Si linkage as an integral part of the structure.

The reaction of silamines, having a plurality of silicon-nitrogen functional groups, with compounds containing more than one epoxy group apparently results in the formation of a cross-linked reaction product which, depending upon the amount and type of silamine used, may vary in character from soft or rubbery to hard or brittle. Preferred ratios of silamine to epoxy compositions are based primarily on the stoichiometric amount of active hydrogen attached to the nitrogen atom in the silamine to reactive epoxy groups of the epoxy resin.

The reaction of a silamine with a compound containing an epoxy group is believed to involve an opening of the epoxy ring and the formation of a repeating unit having incorporated into the molecular structure the silicon atoms and, to a large extent, all of the nitrogen atoms of the silamine. Actually, the specific structure of the reaction products is difficult to determine in view of the complexity of the reaction and the various theoretical mechanisms possible. In general, however, it can be stated that the reaction products appear to contain the nitrogen atoms of the silamine bound-up within the molecular structure as, in substantially all reactions conducted using compositions containing predominantly epoxy groups and no other functional groups, there was a noticeable absence of the evolution of ammonia. However, when silamines are reacted with compositions which contain to an appreciable extent, in addition to epoxy groups, other functional groups, for example, an hydroxyl group as is characteristic of Shell's Epon 1004, there is a definite evolution of ammonia. Reactions of silamines with organic compositions containing hydroxy groups is disclosed and claimed in the copending application of Boyer et al., Serial No. 775,350, filed November 21, 1958. Where a silamine is reacted with a particular composition containing, for example, both an hydroxyl group and an epoxy group, experience has indicated an initial reaction with the hydroxyl group and subsequent reaction with the epoxy group, partially evidenced by the initial evolution of ammonia with further reaction without appreciable evolution of ammonia.

For molded products, particularly, silamine blends or hybrid copolymers, derived from the ammonolysis of mixtures of di and trifunctional halosilanes and which are normally liquid at room temperature, are presently preferred as curing agents for epoxy compositions. Such silamines may be more readily mixed with most epoxy compositions, of which many are also normally liquid, and are capable of producing cured, solid resinous bodies rather than the soft or liquid-like products frequently obtained when using many difunctional silamines. Trifunctional silamines may, likewise, be employed, but due to the natural tendency of many of them to readily polymerize to a hard state, it will generally be found necessary to keep such silamines in a solvent and to add them to the epoxy compound as a solution with the solvent. Higher alkyl trifunctional silamines, such as the amyl and butyl silamines, do not tend to polymerize as easily as the lower alkyl silamines and, hence, may frequently be used without a solvent. Tetrafunctional silamines, because of their extreme tendency to self-polymerize to a solid mass, will normally require the presence of a lower functional silamine in order to be used as a practical curing agent for epoxy compositions.

For limited applications wherein, for example, it is desired to block a particular epoxy group and thereby limit or control the degree of resin formation, a monofunctional silamine may be employed, such as that derived from trimethylchlorosilane. The epoxy group may be considered, to a limited extent, difunctional when opened by reaction with silamines as contemplated herein. Hence, resinous compositions may correspondingly be formed from compounds containing only a single epoxy group, although such compositions will normally not be capable of attaining a high degree of cross-linking. However, to obtain the desired reactions as principally contemplated herein, the epoxy compounds employed should have, as an average, an epoxy equivalent of greater than one, i.e., an average of more than one epoxy group per molecule.

Among the many organic groups which may be attached to the silicon atom of the mono, di or trifunctional silamines contemplated by the present invention, the following are illustrative: (alkyl)-methyl, ethyl, lauryl, isopropyl, tertiary butyl, cyclopropyl, cyclohexyl, and substituted alkyl groups such as 2-chloroethyl, beta-trichlorosilyl-ethyl; (aryl)-phenyl, alpha or beta-naphthyl and substituted aryl groups, such as para-chlorophenyl, para-trichlorosilylphenyl; (aralkyl)-phenethyl; (alkoxy)-methoxy, ethoxy, tertiary-butoxy; (aryloxy)-phenoxy, and unsaturated groups (alkenyl) vinyl and allyl, (alkynyl) ethynyl. Also contemplated are organic groups, such as (alkylthio) methylthio, ethylthio; (arylthio) phenylthio; and radicals derived from secondary amines, for example, dimethylamino, diethylamino, methylphenylamino.

Primary amines that may be used for aminolysis of halosilanes are methylamine, ethylamine, allylamine, ethylenediamine, hexamethylenediamine, aniline, para-phenylenediamine and benzylamine or mixtures of such amines with each other or with ammonia.

When silamines are formed, it is quite common to find the resulting reaction product containing entrapped ammonia. If the entrapped ammonia is not removed prior to reaction with an epoxy compound, it will be found that the silamine-epoxy reaction product will contain bubbles and may, accordingly, be undesirable from either a property or appearance standpoint. However, in some instances, the entrapped ammonia, under controlled conditions, can be used to purposely produce foaming so that a final light-weight product can be obtained.

The preferred silamine curing agents for epoxy resins at present are those silamines formed by ammonolyzing a monovalent alkyl or aryl halosilane and, particularly, an initial mixture consisting of substantially equal molar portions of the lower alkyl difunctional and trifunctional chlorosilanes, a specific example being a mixture of dimethyldichlorosilane and methyltrichlorosilane. Silamines of the latter type, when used to the extent of about twenty-five percent based on the weight of an epoxy compound like Shell Chemical Company's Epon 828 to produce a casting, will give a hard product having a high heat distortion point.

Examples of epoxy-silamine reactions are set forth below as illustrating the invention, but not with the intention of thereby limiting the scope of the invention.

*Example I*

A silamine was made by reacting a mixture of 74 grams of $CH_3SiCl_3$ and 49 grams of $(CH_3)_2SiCl_2$ in a hexane solution with one liter of liquid ammonia. The ammonium chloride precipitate formed was removed by filtration, followed by removal of the hexane. The resulting silamine was then added directly to Shell's Epon 828 resin in the amount of twenty-five percent silamine to seventy-five percent epoxy resin, percentages being based on weight. The reaction mixture was maintained at 60° C. overnight and found to be still in the liquid state. Continued heating for eighteen hours at 100° C. produced a soft solid and a final heat treatment for three hours at 150° C. gave a very hard solid.

*Example II*

Seventy-four grams of $CH_3SiCl_3$ together with 64 grams of $(CH_3)_2SiCl_2$ in a hexane solution were reacted with one liter of liquid ammonia followed by removal of the precipitate and solvent. A reaction mixture consisting of a twenty-five–seventy-five ratio by weight of silamine and Shell's Epon 828 resin was made up by mixing the two directly together. The solution was heated for fifteen hours at 100° C., gixing a soft solid and then subjected to a temperature of 150° C. for three hours. The product, when removed from the oven and cooled, was found to be a very hard, well-cured, translucent solid.

*Example III*

The following mixture of chlorosilanes was reacted with one and one-half liters of liquid ammonia in the presence of hexane as a solvent.

| | Grams |
|---|---|
| $CH_3SiCl_3$ | 74 |
| $C_6H_5SiCl_3$ | 105 |
| $(CH_3)_2SiCl_2$ | 64 |
| $(C_6H_5)_2SiCl$ | 126 |

A composition consisting of twenty-five percent of the resulting silamine and seventy-five percent of Shell's Epon 828 resin was made up. Forty grams of this mixture were placed in a mold and heated to 150° C. It was found that the mixture jelled in one hour to a clear product.

*Example IV*

A reaction mixture was prepared consisting of twenty percent diphenyldiaminosilane and eighty percent of Shell's Epon 1004 epoxy resin (a bisphenol-epichlorohydrin reaction product having a molecular weight of approximately one thousand and an epoxide equivalent of about 905–985). Prior to mixing, the epoxy resin was melted at 105° C. and the liquid silamine added to the melted product. The mixture was placed in an oven at 150° C. and was found to cure to a hardened state in thirty minutes. During the cure, free ammonia which was present gave an expanded final product having a density of .256 gram per cc.

*Example V*

Forty-four grams of liquid ethylene oxide and 84 grams of $SiCl_4$ were each mixed separately with 100 grams of methylal. The ethylene oxide solution was slowly introduced with constant stirring into the $SiCl_4$ solution, the reaction temperature rising to about 45° C. After standing overnight, the haloalkoxy silicon halide thus produced was mixed with sufficient methylal to bring the total volume to one liter. A solution of one-half liter of liquid ammonia and one liter of methylal was placed in a Dewar flask and the haloalkoxy silicon halide added slowly with stirring. After boiling off the remaining ammonia present and filtering the precipitate, 81 grams of a low viscosity liquid was obtained. Five grams of this product were mixed with 15 grams of Shell's Epon 828 resin. The mixture was placed in an oven at 130° C. After an hour, the temperature was raised to 200° C., resulting in a hard product.

*Example VI*

Sixteen grams of epoxylated novolak (average molecule containing five phenolic nuclei and having 3.5 to 4 epoxy groups) and 16 grams of Shell's Epon 828 were heated and mixed to make a homogeneous liquid. Eight grams of silamine (prepared by ammonolysis of a 1:1 molar ratio mixture of methyltrichlorosilane and dimethyldichlorosilane) was added to the foregoing resins. After heating in a beaker at 150° C. for a few minutes to expel bubbles, the mixture was placed in an aluminum mold. Curing consisted of heating at 120° C. for fourteen hours, followed by a five hour heat treatment at 150° C. and a final two hour heating at 200° C. The resultant product was hard and clear.

*Example VII*

Vinyltriaminosilane was prepared by mixing 100 grams of vinyltrichlorosilane with anhydrous methylal. This mixture was slowly dripped while stirring into a four liter Dewar flask containing one and one-half liters of liquid ammonia. After the liquid ammonia was boiled off, the mixture was filtered. The filtrate was heated in a water bath until no more solvent was apparent. The resulting liquid was yellow and viscous. Ten grams of this resin was mixed with 30 grams of Shell's Epon 828. The mixture was heated in a beaker at 200° C. for fifteen minutes to expel foam and then placed in an oven and subjected to a temperature of 150° C. for fifteen hours. Upon removal from the oven, it was found that the resulting product was a resilient resin substantially bubble-free.

*Example VIII*

Ten grams of ditertiary-butoxydiaminosilane were mixed with 30 grams of Shell's Epon 828. The mixture was placed in an oven for one hour at 115° C., whereupon a slight increase in viscosity was observed. The temperature was raised to 130° C. and in one-half hour, the mixture had gelled to a firm resin.

*Example IX*

Fifty grams of SiCl₄ was mixed with two liters of methylal. One-half liter of liquid methylamine was drawn off into a four liter Dewar flask. One-half liter of methylal was added. The SiCl₄ solution was slowly dripped into the Dewar flask with stirring. After mixing, the liquid and residue were placed in a stainless steel pan and covered. The temperature was raised to eliminate dissolved methylamine and also to reduce the hazard of moisture condensation, the mixture then being filtered. The filtrate was then concentrated by heating in a stainless steel pan in a water double boiler. The resulting solution was clear, pale yellow. Six grams of a methylal solution of the silamine (1.8 grams of silamine) were mixed with 8 grams of Shell's Epon 828. The mixture was heated mildly for two hours by placing on top of the oven. Most of the solvent had evaporated so it was placed in an oven at 150° C. After one hour at 150° C., the mixture had become a hard, glassy resin.

In general, the foregoing disclosure has emphasized the use of silamines for reaction with or the curing of epoxy resins or forming resinous compositions from compounds containing a plurality of epoxy groups. However, it should be understood that the scope of the invention is broader than such applications as is illustrated by the following example involving a reaction of a silamine with a compound containing a single epoxy group, namely phenylglycidylether.

*Example X*

Nine grams of phenylglycidylether was mixed with 30 grams of diphenyldiaminosilane. The mixture was heated for one hour at 150° C., then for sixteen hours at 100° C., followed by a final heat treatment for five and one-half hours at 120° C. The composition was found to have attained a markedly increased viscosity.

The foregoing examples illustrate the fact that by selecting appropriate reactants, a wide variety of new compositions may be formed which can be used directly for a given purpose or modified further to obtain numerous compositions having desired properties.

As previously indicated, silamines, in general, will not cure or react with epoxy compositions at room temperature except over extended periods of time, frequently days or weeks. It is usually necessary to subject a mixture of the two to elevated temperatures, ranging up to 150° or above, to obtain the desired reaction in a relatively short period, such as several hours or so. Silamines made from a primary amine tend to react with epoxy resins somewhat more rapidly than silamines derived from ammonia. The silamine-epoxy reaction may frequently be hastened by adding accelerators, such as Shell BF₃-400, a boron trifluoride amine complex. The average commercial curing agent for epoxy resin systems, in general, must be kept separate from the resin and only added immediately before use, as the combination when mixed together normally has an exceedingly short shelf-life. However, most of the silamines employed as curing agents for epoxy resin systems may be added directly to the resin, the resulting mixture having a shelf-life of days, weeks, or even months. Curing may be accomplished as desired by application of heat to the system. Silamine curing agents, accordingly, offer greater utility for epoxy resins.

As previously indicated, the use of silamines to cure epoxy resins enables the manufacture of products from such resins which have low shrinkage and exceptionally high heat distortion points. Depending on the reactants, may silamine-epoxy products, particularly those involving the di and trifunctional lower-alkyl silamine combinations, have been found to have heat distortion points of the order of 200° C. or above, as determined by the ASTM Test No. D648-45.

Industrial laminates having enhanced electrical and physical properties may be formed from impregnating varnishes containing silamine-epoxy combinations together with a solvent. A particular advantage of silamine-epoxy products is their marked adherence to glass, permitting numerous applications wherein glass filler or fiber are required for strength or otherwise. Selection of the appropriate silamine-epoxy combination from a wide variety of possibilities enables tailoring of resinous products to many requirements and will afford even greater acceptance of the epoxy-type resin than has heretofore been attained.

While there has been described certain exemplary embodiments of the invention, the same is only intended to be limited by the scope of the following claims.

We claim:

1. The product of a reaction between (1) an organic compound containing an average of more than one

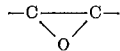

group per molecule, and (2) a composition characterized by having an Si—N—Si linkage as an integral part of its structure and obtained from the reaction of a halosilane with an ammoniacal compound selected from the class consisting of ammonia and primary amine wherein the amino group is the sole functional group.

2. A product of the type described in claim 1 wherein the halosilane is a chlorosilane.

3. A product of the type described in claim 2 wherein the ammoniacal compound is ammonia.

4. The product of a reaction between (1) a resinous composition containing an average of more than one

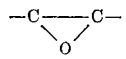

group per molecule, and (2) a composition characterized by having an Si—N—Si linkage as an integral part of its structure and obtained from the reaction of a halosilane with an ammoniacal compound selected from the class consisting of ammonia and primary amine wherein the amino group is the sole functional group.

5. The product of a reaction between (1) a polyglycidyl ether of a polyhydroxy compound, and (2) a compound characterized by having an Si—N—Si linkage as an integral part of its structure and obtained from the reaction of an ammoniacal compound selected from the class consisting of ammonia and primary amine wherein the amino group is the sole functional group with a halosilane having the generic formula $$R_nSiHal_{4-n}$$

wherein "R" is a member of the class consisting of hydrogen and an organic group attached to the silicon; "Hal" is a halogen atom attached to the silicon, and "n" is an integer from 1 to 3.

6. The product of a reaction between (1) a resinous compound having an average of more than one

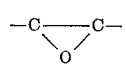

group per molecule, and (2) a compound characterized by having an Si—N—Si linkage as an integral part of its structure and obtained from the reaction of an ammoniacal compound selected from the class consisting of ammonia and primary amine wherein the amino group is the sole functional group with an organic silicon halide having the generic formula

wherein "R" is a member of the class consisting of alkyl and aryl radicals attached to the silicon; "Hal" is a halogen atom attached to the silicon, and "n" is an integer from 1 to 3.

7. The product as described in claim 4 wherein the resinous compound is derived from a fusible phenolic-aldehyde condensation product.

8. The product of a reaction between (1) an epoxy composition obtained from a reaction of epichlorohydrin with a compound containing at least two hydroxyl groups, and (2) a compound characterized by having an Si—N—Si linkage as an integral part of its structure and obtained from the reaction of an ammoniacal compound selected from the class consisting of ammonia and primary amine wherein the amino group is the sole functional group with an organic silicon halide having the generic formula $R_nSiHal_{4-n}$ wherein "R" is a member of the class consisting of alkyl and aryl radicals attached to the silicon; "Hal" is a halogen atom attached to the silicon, and "n" is an integer from 1 to 3.

9. The product of a reaction between (1) an epoxy composition obtained from a reaction of epichlorohydrin with a bisphenol, and (2) a compound characterized by having an Si—N—Si linkage as an integral part of its structure and obtained from the reaction of an ammoniacal compound selected from the class consisting of ammonia and primary amine wherein the amino group is the sole functional group with an organic silicon halide having the generic formula

wherein "R" is a member of the class consisting of alkyl and aryl radicals attached to the silicon; "Hal" is a halogen atom attached to the silicon; and "n" is an integer from 1 to 3.

10. The product of a reaction between (1) an epoxy composition obtained from a reaction of epichlorohydrin with a bisphenol, and (2) the ammonolysis reaction product of a chlorosilane having the generic formula

wherein "R" is a member of the class consisting of alkyl and aryl radicals attached to the silicon, the chlorine is attached to the silicon, and "n" is an integer from 1 to 3, said ammonolysis reaction product being characterized by having an Si—N—Si linkage as an integral part of its structure.

11. The product as described in claim 10 wherein "n" equals 2.

12. The product as described in claim 10 wherein "n" equals 1.

13. The product of a reaction between (1) a resinous compound having an average of more than one

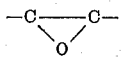

group per molecule, and (2) a compound characterized by having an Si—N—Si linkage as an integral part of its structure and obtained from the reaction of an ammoniacal compound selected from the class consisting of ammonia and primary amine wherein the amino group is the sole functional group with a mixture of at least two different organic silicon halides each having the generic formula

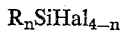

wherein "R" is a member of the class consisting of alkyl and aryl radicals attached to the silicon; "Hal" is a halogen atom attached to the silicon, and "n" is an integer from 1 to 2.

14. The product as described in claim 13 wherein said mixture consists of methyl-trichlorosilane and dimethyl-dichlorosilane.

15. The product as described in claim 14 wherein said chlorosilanes are present in said mixture in a molar ratio of substantially 1 to 1.

16. The product as described in claim 13 wherein said mixture comprises both alkyl and aryl chlorosilanes.

17. The process of preparing a composition of matter comprising the step of reacting (1) an organic compound containing an average of more than one

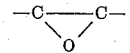

group per molecule, and (2) a composition characterized by having an Si—N—Si linkage as an integral part of its structure and obtained from the reaction of a halosilane with an ammoniacal compound selected from the class consisting of ammonia and primary amine.

18. The process as described in claim 17 wherein the halosilane is a chlorosilane and the ammoniacal compound is ammonia.

19. The process of preparing a resin comprising the step of reacting (1) a resin containing an average of more than one

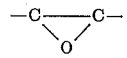

group per molecule, and (2) a compound characterized by having an Si—N—Si linkage as an integral part of its structure and obtained from the reaction of a chlorosilane having at least two replaceable chlorine atoms attached to the silicon with an ammoniacal compound from the class consisting of ammonia and primary amine wherein the amino group is the sole functional group.

20. The process of preparing a resin comprising the step of reacting (1) a resin containing an average of more than one

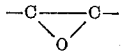

group per molecule, and (2) the ammonolysis reaction product of a mixture of at least two different chlorosilanes, said ammonolysis reaction product being characterized by having an Si—N—Si linkage as an integral part of its structure.

21. The process as described in claim 20 when said mixture consists of a chlorosilane having two replaceable halogen atoms attached to the silicon and a chlorosilane having three replaceable halogen atoms attached to the silicon.

22. The process as described in claim 21 wherein said mixture consists of methyltrichlorosilane and dimethyldichlorosilane.

23. The process as described in claim 20 wherein said mixture consists of a dialkyldichlorosilane and a diaryldichlorosilane.

24. The process of preparing a resin comprising the step of reacting (1) an epoxy composition derived from the reaction of a bisphenol and epichlorohydrin, with (2) a compound characterized by having an Si—N—Si linkage as an integral part of its structure and obtained from the ammonolysis of a chlorosilane which has at least two replaceable chlorine atoms attached to silicon.

25. A composition capable of forming a hard, resinous product comprising (1) a compound containing an average of more than one epoxy group per molecule, and (2) the product of the reaction of ammonia with an organic silicon halide having the general formula

wherein "R" is a member of the class consisting of alkyl and aryl radicals attached to silicon; "Hal" is a halogen atom attached to the silicon; and "n" is an integer from 1 to 2, said ammonolysis reaction product being characterized by having an Si—N—Si linkage as an integral part of its structure.

26. A composition capable of forming a hard, resinous product comprising (1) a compound containing an average of more than one epoxy group per molecule, and (2) the product of the reaction of ammonia with a mixture of halosilanes comprising predominantly methyltrichlorosilane and dimethyldichlorosilane in substantially equal molar amounts, said ammonolysis reaction product being characterized by having an Si—N—Si linkage as an integral part of its structure.

27. A composition as described in claim 26 wherein the epoxylated compound is derived from the reaction of epichlorohydrin and a bisphenol.

28. A composition as described in claim 26 wherein the epoxylated compound is derived from the reaction of epichlorohydrin and a fusible phenolic-aldehyde condensation product.

References Cited in the file of this patent

UNITED STATES PATENTS

| | | |
|---|---|---|
| 2,843,560 | Mika | July 15, 1958 |
| 2,876,209 | De Benneville et al. | Mar. 3, 1959 |
| 2,885,419 | Beinfest et al. | May 5, 1959 |

FOREIGN PATENTS

| | | |
|---|---|---|
| 760,309 | Great Britain | Oct. 31, 1956 |
| 788,806 | Great Britain | Jan. 8, 1958 |

OTHER REFERENCES

McGregor: "Silicones and Their Uses," pages 228–230. McGraw-Hill Company, publishers, New York, N.Y. (1954).

Rochow: "Chemistry of the Silicones," pages 74–75, John Wiley and Sons, publishers, New York, N.Y., 2nd edition, 1951.